United States Patent [19]

Grosfilley

[11] Patent Number: 5,610,494
[45] Date of Patent: Mar. 11, 1997

[54] DEVICE FOR RECHARGING THE STORAGE BATTERY OF AN INTRA-AURICULAR PROSTHESIS, AND METHOD FOR MANUFACTURING SAME

[75] Inventor: Jean-Etienne Grosfilley, Massieux, France

[73] Assignee: Audiologie Prothese Innovation A.P.I., Lyons, France

[21] Appl. No.: 295,865

[22] PCT Filed: Mar. 12, 1993

[86] PCT No.: PCT/FR93/00249

§ 371 Date: Oct. 28, 1994

§ 102(e) Date: Oct. 28, 1994

[87] PCT Pub. No.: WO93/18629

PCT Pub. Date: Sep. 16, 1993

[30] Foreign Application Priority Data

Mar. 13, 1992 [FR] France .................................. 92 03267

[51] Int. Cl.$^6$ ................................................. H01M 10/46
[52] U.S. Cl. ................................. 320/2; 381/69; 381/69.2
[58] Field of Search .................... 320/2, 5, 39; 381/68, 381/69.2, 69

[56] References Cited

U.S. PATENT DOCUMENTS 3,939,400  2/1976  Steele .
4,186,335  1/1980  Cahill .
4,293,808  10/1981  Varadi et al. ................. 320/2
4,379,988  4/1983  Mattatall ....................... 320/4
5,210,804  5/1993  Schmid ....................... 381/69.2
5,253,300  10/1993  Knapp ..................... 381/69.2 X

FOREIGN PATENT DOCUMENTS 0197630  10/1986  European Pat. Off. .

OTHER PUBLICATIONS

T. Gitles et al., "The Rechargeable Hearing Instrument System", *Hearing Instruments*, vol. 38, No. 7, 1987, pp. 16–18.
"Rechargeable ITE", *Hearing Instruments*, vol. 41, No. 12, Dec. 1990, p. 41.
European Search Report, 2 pages Jul. 1993.

*Primary Examiner*—Edward H. Tso
*Attorney, Agent, or Firm*—Oliff & Berridge

[57] ABSTRACT

A device for recharging the storage battery of an intra-auricular auditory prosthesis has a recess capable of receiving the prosthesis. The recess corresponds to the external shape of the prosthesis and has two conducting terminals that project from the wall of the support delimiting the recess and are connected to an electric current source. The auditory prosthesis includes a storage battery and two conducting surfaces connected to the terminals of the storage battery, each surface being capable of contacting one of the conducting terminals of the support when the auditory prosthesis is engaged in the recess.

17 Claims, 1 Drawing Sheet

DEVICE FOR RECHARGING THE STORAGE BATTERY OF AN INTRA-AURICULAR PROSTHESIS, AND METHOD FOR MANUFACTURING SAME

BACKGROUND OF THE INVENTION

The present invention relates to a device for recharging the storage battery of an intra-auricular auditory prosthesis, to the intra-auricular auditory prosthesis which can be used with this device, and to a method for manufacturing this device.

An intra-auricular auditory prosthesis has a hollow body housing a miniaturized battery which is used for feeding the microphone, the amplifier and the receiver which said prosthesis comprises, these themselves also being miniaturized and housed in said body, and it has relatively reduced dimensions, a smooth outer wall and a specific shape adapted for it to be placed and worn in the ear.

The battery has to be changed every three to fifteen days, depending on the prostheses. To do this, it is necessary to lift the closure flap of the battery casing, remove the used battery, replace it with another, and then put the lid of the casing back in place.

It is easy to imagine the difficulties which these various successive operations can present for persons with poor control of their hands, in particular the elderly, taking into consideration the difficulties involved in gripping and holding the body of the prosthesis during its removal and during the positioning of the battery, itself difficult to grip.

The prosthesis can be lost or damaged if dropped to the ground during these maneuvers.

Moreover, the opening flap already mentioned is situated on that face of the body of the prosthesis which can be seen from the outside when said prosthesis is placed in the ear, which state of affairs is prejudicial to the visual appearance of the prosthesis.

A prosthesis does in fact exist which comprises a storage battery and a coil permitting the recharging of the storage battery by induction, that is to say without removing it from the body, and this is described in the journal "Hearing Instruments", vol. 38, no. 7 of July 1987, but this prosthesis has the disadvantage of being very bulky on account of the dimensions of the coil and, as a result, rather conspicuous and unattractive.

SUMMARY OF THE INVENTION

The object of the present invention is to remedy all these disadvantages.

To this end, the device to which it relates comprises a support having a recess which corresponds exactly to the external shape of the prosthesis and into which the latter can be introduced, and two conducting terminals which are connected to an electric current source and project from the wall of the support delimiting the said recess. The intra-auricular auditory prosthesis which can be used with this support comprises, for its part, a storage battery and two conducting surfaces connected to the terminals of the storage battery, each one capable of coming into contact with one of the conducting terminals of the support when the prosthesis is engaged in the recess which said support comprises for receiving said prosthesis.

Thus, it suffices to introduce the prosthesis into the recess of the support in order to bring the conducting surfaces which it comprises into contact with the terminals of the support and in order to be able to recharge the storage battery. Consequently, it is no longer necessary to manipulate the prosthesis, to open it in order to remove the storage battery, or to provide an unattractive flap on one of the walls of the body thereof.

The support can of course have a single or double recess depending on whether the patient has one prosthesis or two prostheses.

The support of the prosthesis is advantageously made of a flexible material, such as silicone putty.

The flexibility of this material facilitates the positioning and removal of the prosthesis and allows the latter play in relation to its support until it is placed in its correct position permitting the recharging of the storage battery.

The contact surfaces of the prosthesis are preferably situated at the bottom of two holes formed in the wall thereof and capable of being engaged on the contact terminals of the support.

In this way, when the terminals are engaged in the holes, the prosthesis is immobilized in relation to its support, whereas, as has been indicated hereinabove, as the material constituting the support is flexible, the prosthesis can exhibit play in relation to the latter. Thus, depending on whether the prosthesis exhibits play or not, the user can tell whether or not it is correctly positioned for the recharging of the storage battery.

The support and the conducting terminals are advantageously placed in a box equipped with a lid, this box comprising a connection point to the electric current supply source. The inner face of the lid can comprise a pad of flexible material arranged in such a way as to bear on the prosthesis when the lid is in the closed position, this making it possible to ensure that the conducting surfaces of the prosthesis come into contact with the terminals of the support and that this contact is maintained.

The invention also relates to a method for producing the support in accordance with at least one of the claims hereinafter, consisting essentially in casting the material intended to constitute the support around the prosthesis in such a way that the support thereby obtained has a recess formed, in fact, by the impression of the prosthesis itself. As a result, the latter can be positioned with perfect precision in relation to the conducting terminals.

Silicone putty is advantageously employed as the material for constituting the support.

When the prosthesis comprises the two holes mentioned above, these are preferably formed with a diameter and a depth which are such that they allow the conducting terminals to be engaged and held on the prosthesis, the method then consisting in engaging the prosthesis on said terminals, in casting the material which is to constitute the support around the prosthesis and the terminals, in removing the prosthesis by releasing the terminals from its holes, then in drilling the holes in such a way that they pass through its wall, the conducting surfaces then being placed inside the body of the prosthesis, opposite the opening of the holes. The positioning of the prosthesis during the casting operation is thus obtained by means of the conducting terminals themselves, and, consequently, in a particularly simple manner. Moreover, the holes are situated exactly opposite the terminals upon engagement of the prosthesis in the bottom of its recess.

BRIEF DESCRIPTION OF THE DRAWING

The invention will at any rate be clearly understood with the aid of the description which follows and in which reference is made to the attached diagrammatic drawing which shows, by way of nonlimiting example, a preferred embodiment of the device and of the prosthesis to which it relates.

Figure 1:
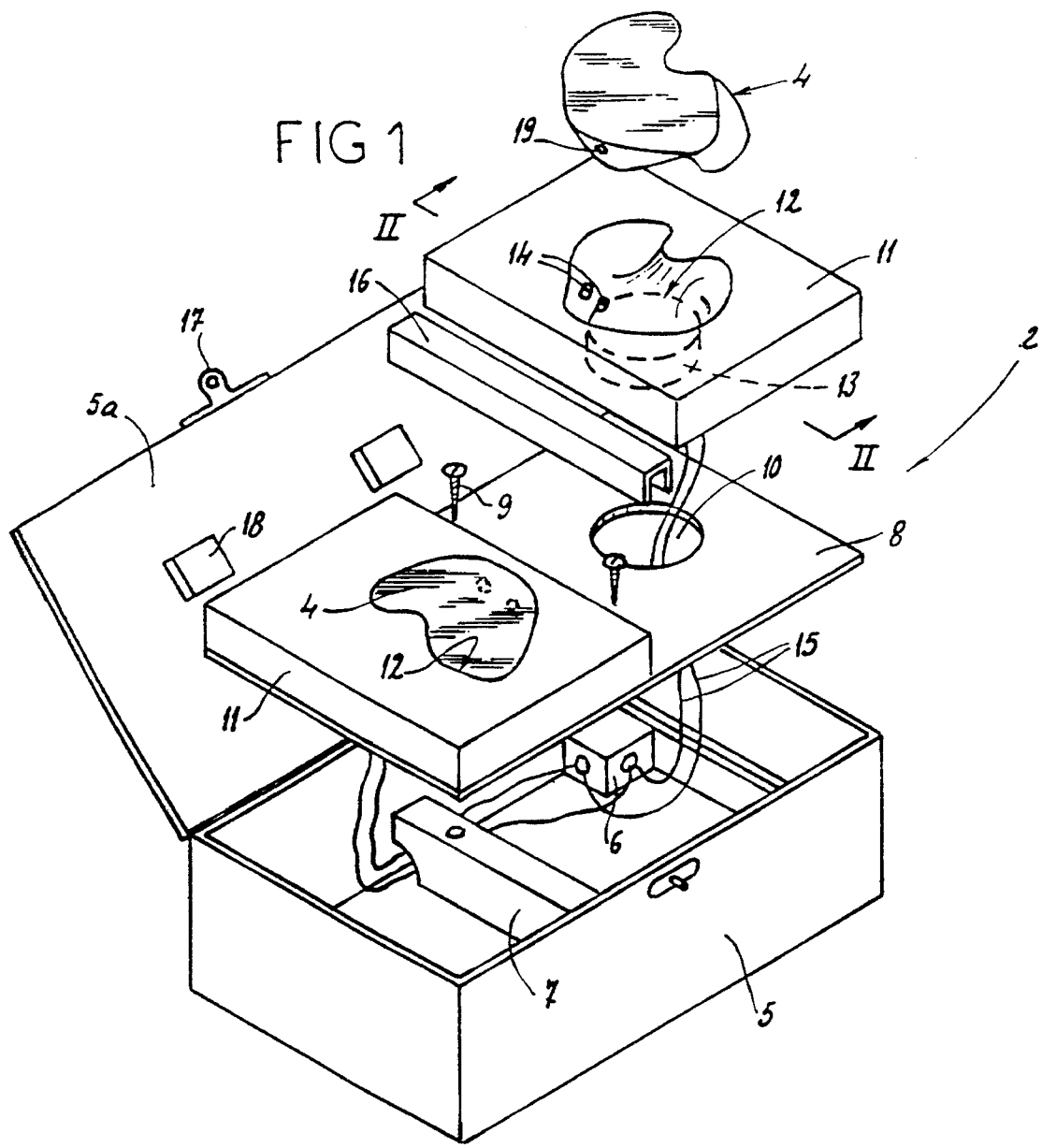
FIG. 1 is an exploded perspective view.

The Figures show, from different angles, a device 2 for recharging the storage batteries 3 of a pair of intra-auricular auditory prostheses 4 for the left and right ears.

The device 2 comprises:

a box 5 equipped with a lid 5a and a connection point 6 to an electric current supply source;

a crosspiece 7 on which a plate 8 can be mounted with the aid of screws 9, the plate 8 comprising two holes 10 formed at the center of each of its parts situated on each side of the crosspiece 7;

two blocks 11 of silicone putty, each one comprising a recess 12 for receiving the prosthesis 4, said recess being formed in fact by the impression of the prosthesis 4 itself, and a cylindrical pin 13 able to be engaged through the hole 10 for holding the block 11 on the plate 8;

two pairs of conducting terminals 14, each one passing through one of the blocks 11, one of the ends of the terminals 14 projecting from the wall of the block 11 into the recess 12, and their other end being connected to the connection point 6 by way of wires 15 conducting electric current, and a covering bar 16 which fills the space between the blocks 11 and conceals the screws 9.

The box 5 comprises a closure fastener 17, and its lid 5a comprises pads 18 of flexible material which are arranged in such a way as to bear on the prostheses 4 in the closed position of the lid 5a.

Each prosthesis 4 comprises two holes 19 which pass through its wall and are able to be engaged on the end of the terminals 14 which project from the block 11 into the recess 12, and two electrically conducting surfaces, such as metal filaments, which are fixed to the inner face of the wall of the prosthesis 4.opposite the opening of the holes 19 and which are connected electrically to the terminals of the storage battery 3.

Figure 2:
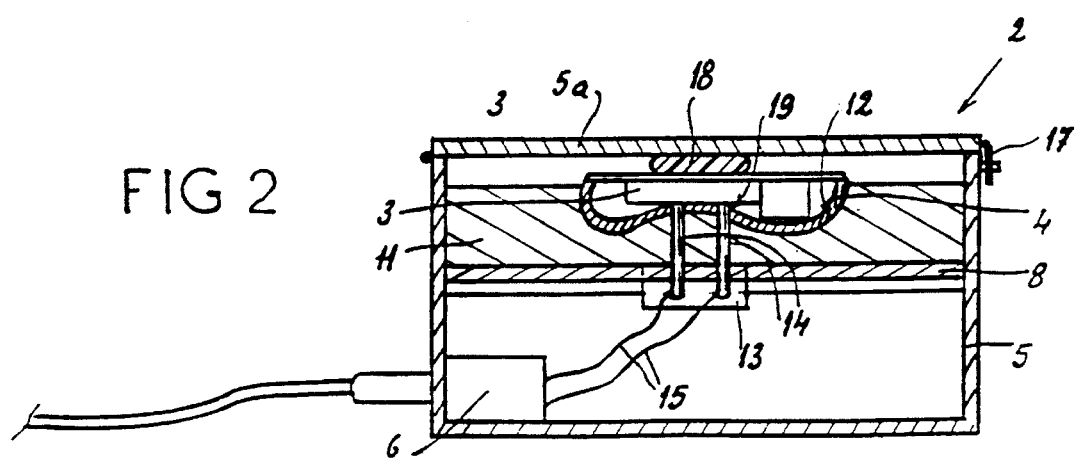
FIG. 2 is a sectional view along II—II in FIG. 1.

As can be seen from the Figures, the recesses 12 are intended to receive the prostheses 4 during the operation of recharging the storage batteries 3, with the latter being engaged on the terminals 14 by means of the holes 19. The fact that the recesses 12 are formed by the impression of the prostheses 4 themselves permits their exact positioning in relation to the terminals 14, such that their engagement on said terminals is easy to perform, even by a partially deaf person with limited manual dexterity. The flexibility of the material constituting the blocks 11 facilitates the positioning and removal of the prostheses and allows the latter play in relation to the blocks until they are placed in the correct position permitting their engagement on the terminals 14. In this position they are immobilized in relation to the blocks 11; it is therefore easy for the user to tell, depending on whether the prostheses 4 do or do not exhibit play in relation to the blocks 11, if they are correctly positioned or not for the recharging of the storage batteries 3. As is shown in FIG. 2, the pads 18 bear against the prostheses 4 in order to ensure that the contact between their conducting surfaces and the conducting terminals 14 is maintained.

Indicator lights can be provided in order to indicate the correct positioning of the prosthesis in its support and the satisfactory progress of the charging of the storage batteries.

The preferred method for producing the device 2 consists in drilling the holes 19 in the prostheses 4, without having them open out inside the prostheses, and with a diameter and a depth which are such that they allow the terminals 14 to be engaged and held thereon, in engaging said terminals 14 on the prostheses 4, in casting the material which is to constitute the blocks 11 around the prostheses 4 and the terminals, in removing the prostheses 4 by releasing the terminals 14 from the holes 19, then in drilling the holes 19 in such a way that they pass through the wall of the prostheses 4, the conducting surfaces of the prostheses 4 then being placed inside the latter opposite the opening of the holes 19. The positioning of the prostheses 4 during the casting operation is thus obtained by means of the conducting terminals 14 themselves, and, consequently, in a particularly simple manner, and the holes 19 are situated exactly opposite the terminals 14 upon engagement of the prostheses 4 in the bottom of the recesses 12.

I claim:

1. A device for recharging the storage battery of an intra-auricular auditory prosthesis, comprising a support having at least one recess capable of receiving the prosthesis, wherein the recess corresponds exactly to the external shape of the prosthesis, into which recess the latter can be introduced, and two conducting terminals which are connected to an electric current source and project from the wall of the support delimiting said recess.

2. The device as claimed in claim 1, wherein the support of the prosthesis is made of flexible material, such as silicone putty.

3. The device as claimed in claim 1, wherein the support and the conducting terminals are placed in a box equipped with a lid, this box comprising a connection point to the electric current supply source.

4. The device as claimed in claim 3, wherein the lid has an inner face and an outer face, and the inner face of the lid comprises a pad of flexible material arranged in such a way as to bear on the prosthesis when the lid is in the closed position.

5. The device as claimed in claim 1, wherein the device has at least two recesses.

6. An intra-auricular prosthesis for use with a device for recharging a storage battery of the prosthesis, the device including a support having a recess capable of receiving the prosthesis, wherein the recess has a shape corresponding to an external shape of the prosthesis, and the recess has at least one conducting terminal connected to an electric current source and located on a wall of the support defining said recess, wherein the prosthesis further comprises at least one conducting surface connected to a corresponding terminal of the storage battery, and wherein said at least one conducting surface is capable of contacting said at least one conducting terminal of the support when the prosthesis engages the recess for receiving said prosthesis.

7. The prosthesis as claimed in claim 6, wherein the at least one conducting surface is situated at a bottom of at least one corresponding hole formed in a wall of the prosthesis.

8. A method for producing the device as claimed in claim 1, said method comprising;

casting a material defining the support around the prosthesis such that the support thereby obtained has a recess formed by the impression of the prosthesis itself.

9. The method as claimed in claim 8, wherein the method further comprises using silicone putty as the material defining the support.

10. The method as claimed in claim 8, wherein the prosthesis comprises two holes formed with a diameter and a depth to allow the conducting terminals to be engaged and held on the prosthesis, and wherein the method further comprises:

engaging the prosthesis on said conducting terminals;

casting the material defining the support around the prosthesis and the conducting terminals;

removing the prosthesis by releasing the conducting terminals from the two holes;

drilling the holes such that the two holes pass through the wall of the prosthesis; and placing conducting surfaces inside the body of the prosthesis, opposite the opening of each of the two holes.

11. An auditory prosthesis recharging system comprising:

an intra-auricular prosthesis including a storage battery and at least one conducting surface connected to terminals of the storage battery;

the prosthesis having an external surface shaped to conform to an inner ear of a human;

a support having a recess that corresponds to the external surface of the prosthesis; and the support including at least one conducting terminal connected to an electric current source and located on an inner surface of the recess, wherein the shape of the support and the prosthesis correspond so that the at least one conducting terminal and the at least one conducting surface will be in contact with each other when the prosthesis is placed into the recess of the support.

12. The system as claimed in claim 11, wherein the support is made of flexible material.

13. The system as claimed in claim 12, wherein the support is made of silicone putty.

14. A method for making a device for recharging a storage battery of an intra-auricular auditory prosthesis, comprising:

casting a material around the prosthesis to form a support with a recess formed by the prosthesis itself;

providing at least one conducting terminal on an inner wall of the recess; and connecting the at least one conducting terminal to an electric current source.

15. The method as claimed in claim 14, wherein the method further includes using silicone putty as the material that is cast around the prosthesis.

16. The method as claimed in claim 14, wherein the method further comprises projecting the at least one conducting terminal away from the inner wall of the recess.

17. The method as claimed in claim 16, wherein the prosthesis comprises at least one hole formed in a wall of the prosthesis with a diameter and a depth such that said at least one hole allows the at least one conducting terminal to be engaged and held on the prosthesis, the method further comprising;

casting the material which is to comprise the support around the prosthesis and the at least one conducting terminal;

removing the prosthesis by releasing the at least one conducting terminal from the at least one hole;

drilling the at least one hole through the wall of the prosthesis; and placing the at least one conducting surface adjacent an inner end of the at least one hole in the wall of the prosthesis.

* * * * *